(12) United States Patent
Muto et al.

(10) Patent No.: US 6,657,943 B2
(45) Date of Patent: Dec. 2, 2003

(54) PICKUP FEED MECHANISM

(75) Inventors: Akihiro Muto, Saitama (JP); Yoshinori Yamada, Saitama (JP); Tetsuya Uchiyama, Saitama (JP); Koji Asao, Saitama (JP); Yasuhiro Shinkai, Saitama (JP)

(73) Assignee: Pioneer Corporation, Tokyo (JP)

( * ) Notice: Subject to any disclaimer, the term of this patent is extended or adjusted under 35 U.S.C. 154(b) by 105 days.

(21) Appl. No.: 09/805,900

(22) Filed: Mar. 15, 2001

(65) Prior Publication Data
US 2001/0022771 A1 Sep. 20, 2001

(30) Foreign Application Priority Data
Mar. 15, 2000 (JP) ........................................ 2000-071670

(51) Int. Cl.[7] .............................................. G11B 21/02
(52) U.S. Cl. ........................................ 369/219; 369/244
(58) Field of Search ................................ 369/244, 219, 369/44.15, 44.16, 44.22; 360/266.5, 266.6, 267.2, 267.3, 267.4, 267.5, 267.6

(56) References Cited

U.S. PATENT DOCUMENTS 5,063,557 A * 11/1991 Takamatsu et al. ......... 369/219
5,682,282 A * 10/1997 Kato ........................ 360/266.3
6,058,098 A * 5/2000 Kato ............................ 369/219

FOREIGN PATENT DOCUMENTS

| GB | 2147728 A | * 5/1985 | ............ G11B/5/55 |
| JP | 11-149728 | 6/1999 | |
| JP | 11-185407 | 7/1999 | |

* cited by examiner

Primary Examiner—William Korzuch
Assistant Examiner—Mark Blouin
(74) Attorney, Agent, or Firm—Sughrue Mion, PLLC

(57) ABSTRACT

The feed mechanism has a lead screw 11, a pickup assembly 12, an engagement piece 13, and a restrictor piece 14, a compressed coil spring 15, and a bearing portion 16. The engagement piece 13 has a thread portion 41 engaged with a screw groove 23 of the lead screw 11. The engagement piece 13 moves along the lead screw 11 and can come close to and off from the lead screw 11. The pickup assembly 12 moves together with the engagement piece 13. The restrictor piece 14 prevents the engagement piece 13 from disengaging from the lead screw 11, except when the screw groove 23 moves apart from the thread portion 41. The compressed coil spring 15 urges the engagement piece 13 toward the lead screw 11. The bearing portion 16 rotatively supports the lead screw 11 and allows the lead screw 11 to move apart from the engagement piece 13 when the engagement piece 13 has reached an end thereof.

3 Claims, 4 Drawing Sheets

PICKUP FEED MECHANISM

BACKGROUND OF THE INVENTION

1. Field of the Invention

The present invention relates to a pickup feed mechanism which slidingly moves an optical pickup or the like which is used in various types of disc-shaped record medium driving units.

2. Related Art

A disc-shaped record medium driving unit has an optical pickup for reading out information recorded in a disc-shaped record medium like an optical disc. The pickup is located to be opposed to the front face of the disc-shaped record medium and can slide in a radial direction of the disc-shaped record medium.

To slidingly move the pickup in a radial direction of the disc-shaped record medium, there have been used feed mechanisms, for example, disclosed in Japanese Patent Application Laid-open No. H. 11-149728 or NO. H. 11-185407. The feed mechanism has a drive motor, a screw shaft rotationally driven by the motor, a nut moving with the pickup, and a resiliently urging means.

The motor rotates the screw shaft around the axis of the shaft. The screw shaft is defined like a rod extending in a direction and has a screw groove on an outer peripheral surface thereof. The nut is positioned to engage with the screw groove of the shaft. The nut can engage with and disengage from the screw shaft. The resiliently urging means pushes the nut against the screw shaft.

In the thus configured prior-art feed mechanism, the motor rotates the screw shaft so that the nut moves parallel to the axial direction of the screw shaft to transfer the pickup in a radial direction of the disc-shaped record medium.

In the prior-art feed mechanism, a runaway operation of the motor moves the nut to an end of the screw shaft, so that the screw groove of the screw shaft abuts against the screw groove of the nut. Thereby, the nut is pushed in a direction away from the screw shaft against a resilient force of the urging means, resulting in disengagement of the nut from the screw shaft.

The prior-art feed mechanism has a larger friction between the screw groove of the screw shaft and the nut when the resiliently urging means provides a comparatively stronger resilient force. Thus, the motor needs to provide a comparatively larger rotating torque, resulting in a larger size of the motor.

In the mean time, when the resiliently urging means has a comparatively smaller urging force, the friction force between the screw groove of the screw shaft and the nut tends to disengage the nut from the screw groove of the screw shaft. Thus, it happens that, during the rotation of the screw shaft, the nut is disengaged from the screw shaft not to move the pickup to a desired position.

That is, the prior-art feed mechanism tends to be disadvantageous for a flexible design of the urging force of the resiliently urging means and the rotating force of the motor.

SUMMARY OF THE INVENTION

In view of the problems described above, an object of the present invention is to provide a pickup feed mechanism allowing a flexible design thereof.

For achieving the object, a pickup feed mechanism according to the present invention includes:

a screw shaft having a screw groove and driven to turn,
an engagement piece moving parallel to an axis of a screw shaft, the engagement piece having a thread portion engaged with the screw groove of the screw shaft,
a pickup assembly moving parallel to the axis of the screw shaft together with the engagement piece, and
a bearing portion rotatively supporting the screw shaft, the bearing portion allowing the screw shaft to move in a direction away from the engagement piece.

Thus, a larger urging force for pushing the engagement piece against the screw shaft is unnecessary for surely engaging the engagement piece with the screw shaft. This does not require a larger sized driving unit for rotating the screw shaft.

Furthermore, when the rotation of the screw shaft moves the engagement piece to reach an end of the screw shaft, the screw shaft displaces in a direction apart from the engagement piece. Thus, the screw shaft can disengage from the engagement piece without applying an undesirable smaller or larger urging force against the screw shaft.

Accordingly, the urging force of the engagement piece against the screw shaft is normally determined. This is advantageous for a design of the driving mechanism.

Preferably, the engagement piece is movable toward and away from the screw shaft, and the mechanism further has a restrictor means preventing the engagement piece from disengaging from the screw shaft.

Thus, when the rotation of the screw shaft moves the engagement piece to reach an end of the screw shaft, the engagement piece and the screw shaft move apart from each other. Thus, the screw shaft can disengage from the engagement piece without applying an undesirable smaller or larger urging force against the screw shaft.

Moreover, in a normal operation, the restrictor means prevents the engagement piece from disengaging from the screw shaft. Thus, the resiliently urging means can have an appropriate urging force to keep the engagement of the screw shaft with the engagement piece so that the pickup assembly can surely move to a desired position.

Preferably, the mechanism further comprises a resiliently urging means abutting the engagement piece against the screw shaft. Thereby, the screw groove of the screw shaft can surely engage with the engagement piece.

Preferably, the restrictor means moves together with the pickup assembly, and the restrictor means is a restrictor piece which is located in an outer peripheral side of the screw shaft such that the engagement piece keeps a distance from the screw shaft not to disengage from the screw shaft.

The restrictor piece serves to keep the engagement of the screw shaft and the engagement piece with an appropriate urging force, so that the pickup assembly can more surely move to a desired position.

Preferably, the bearing portion has a first bearing rotatively supporting one end of the screw shaft and a second bearing rotatively supporting the other end of the screw shaft, the first bearing having a recess receiving the one end of the screw shaft and a tapered surface provided at an outer periphery of the recess, the tapered surface inclining outward to be opposed to the other end of the screw shaft, the second bearing resiliently urging the other end of the screw shaft toward the one end and allowing the one end of the screw shaft to disengage from the recess.

Thus, when the rotation of the screw shaft moves the engagement piece to an end of the screw shaft, the engagement piece pushes the screw shaft so that the one end of the screw shaft can move along the tapered surface. That is, the screw shaft displaces along the tapered surface in a direction apart from the engagement piece.

Thus, the screw shaft can more surely disengage from the engagement piece without applying an undesirable smaller or larger urging force against the screw shaft.

Preferably, the second bearing has a support extension and a spring piece, the other end of the screw shaft rotatively supported between the support extension and the spring piece, the spring piece having an end face urging the other end of the screw shaft toward the one end of the screw shaft.

This prevents the screw shaft from undesirably deviating in the axial direction, except when the engagement piece moves apart from the screw shaft at an end of the screw shaft.

DETAILED DESCRIPTION OF THE PREFERRED EMBODIMENT

Referring to FIGS. 1 to 5, an embodiment of the present invention will be discussed.

Figure 1:
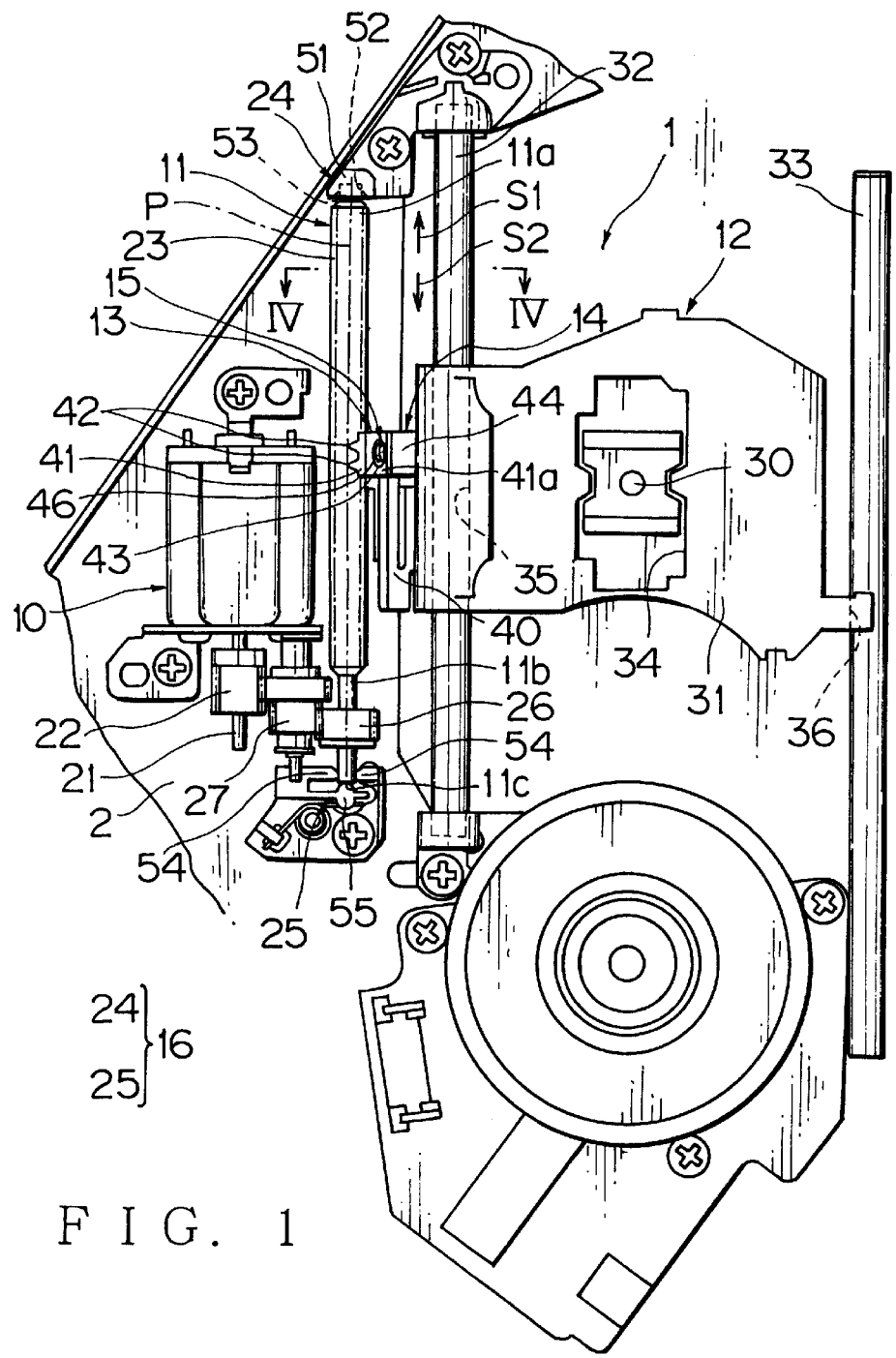
FIG. 1 is a plan view showing a pickup feed mechanism of an embodiment according to the present invention.

As illustrated in some of the drawings including FIG. 1, a pickup feed mechanism 1 according to the present invention reads out information recorded in a disc-shaped record medium like an optical disc and is used in a disc-shaped record medium driving unit which reproduces information stored in the disc-shaped record medium on a compact disc player.

As illustrated in FIG. 1, the pickup feed mechanism 1 is attached on a chassis 2 of the disc-shaped record medium driving unit. The pickup feed mechanism 1 has a driving motor 10, a lead screw 11 which is a screw shaft, a pickup assembly 12, an engagement piece 13, a restrictor piece 14 which is a restrictor means, a compressed coil spring 15 which is a resiliently urging means, a bearing portion 16, etc.

Figure 3:
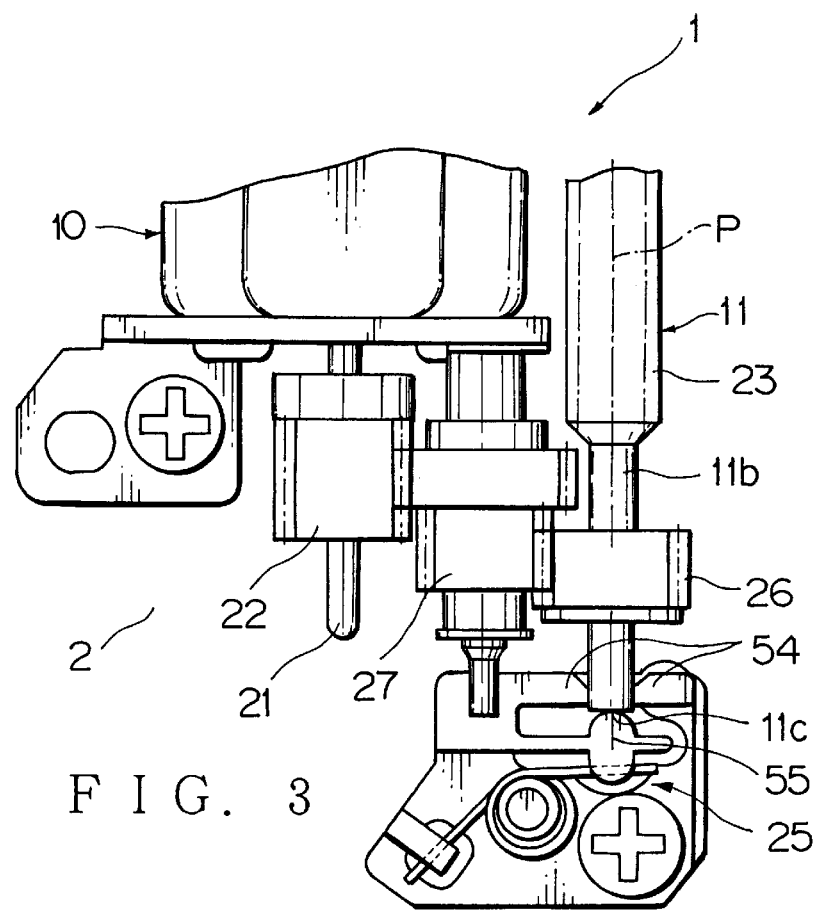
FIG. 3 is an enlarged partial plan view showing the pickup feed mechanism of the embodiment, in which another supported end of the lead screw is particularly illustrated.

The motor 10 is fixed on the chassis 2. AS illustrated in FIGS. 1 and 3, the motor 10 has an output shaft 21 fitted with a pinion gear 22. The lead screw 11 is a rod extended along a chain line P (called as a shaft axis P hereinafter). The lead screw 11 has a screw groove 23 defined in an outer surface of the lead screw 11.

The lead screw 11 has one end 11a rotatively supported on a first bearing 24 (discussed later) of the bearing portion 16 and the other end 11b rotatively supported on a second bearing 25 (discussed later). That is, the lead screw 11 is rotatively supported by the bearing portion 16.

As illustrated in FIGS. 1 and 3, a pinion gear 26 is fitted on the other end 11b of the lead screw 11. The pinion gear 26 is co-axial with the lead screw 11. The pinion gear 26 rotates together with the lead screw 11 around the shaft axis P of the lead screw 11.

As illustrated in FIG. 3, the pinion gear 22 fitted on the output shaft 21 of the motor 10 engages with a transmission gear 27 which, in turn, engages with the pinion gear 26 of the lead screw 11. The transmission gear 27 is rotatively supported by the chassis 2. Thus, the drive force of the motor 10 is delivered to the lead screw 11 through the pinion gear 22, the transmission gear 27, and the pinion gear 26 to rotate the lead screw 11.

The pickup assembly 12 has a pickup (optical pickup) 30 reading out information stored in the disc-shaped record medium, a case 31, and a pair of guide shafts 32, 33. The case 31 is made of a synthetic resin material and accommodates the pickup 30. The case 31 has a window 34 for allowing the pickup 30 to read out information stored in the disc-shaped record medium.

Each guide shaft 32 or 33 is an extended round rod. The guide shafts 32, 33 are spaced from each other and are fixed on the chassis 2. The guide shafts 32, 33 are parallel to each other and are also parallel to the lead screw 11.

The case 31 has a through hole 35 receiving the guide shaft 32 and a recess 36 abutting against the guide shaft 33. The through hole 35 is circular in section. The through hole 35 has a small friction coefficient relative to the guide shaft 32. The recess 36 has an arc shape to fit with an outer surface of the guide shaft 33. The recess 36 has a small friction coefficient against the guide shaft 33.

Thus, the pickup 30 of the pickup assembly 12, which is received in the case 31, is movably supported by the guide shaft 32, 33 in the longitudinal direction of the lead screw 11.

Figure 2:
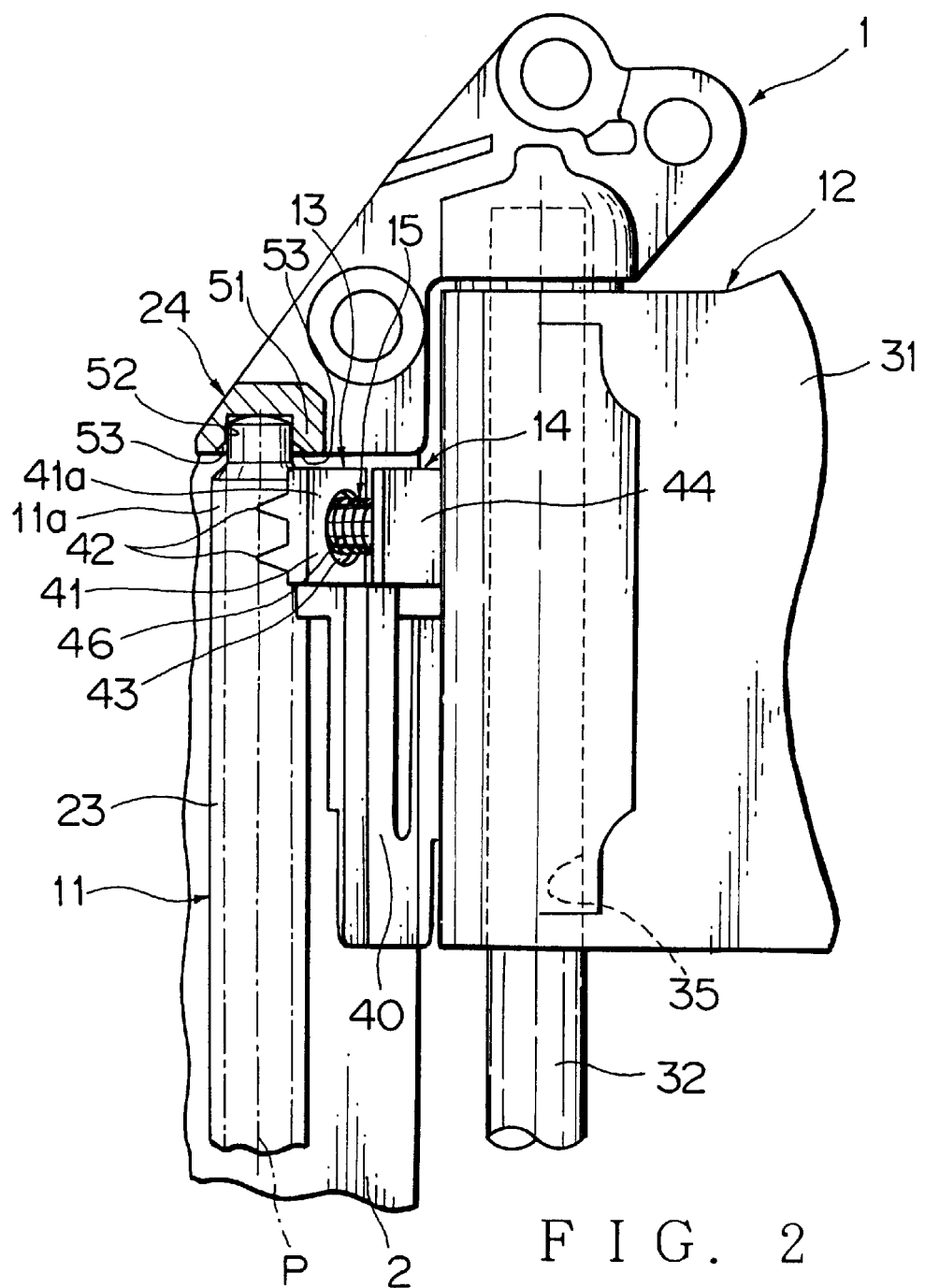
FIG. 2 is an enlarged partial plan view showing the pickup feed mechanism of the embodiment, in which a supported end of a lead screw is particularly illustrated.

As illustrated in FIGS. 1 and 2, the engagement piece 13 has a plate-like extended portion 40 and a thread portion 41. The extended portion 40 is longitudinally parallel to the lead screw 11 and the guide shafts 32, 33. The extended portion 40 has one end which is fitted to the case 31 of the pickup assembly 12. The other end of the extended portion 40 can resiliently deflect to come close to or off from the lead screw 11.

The thread portion 41 is attached to the other end of the extended portion 40. The thread portion 41 has a thread 42 engaging with the screw groove 23 of the lead screw 11. The thread 42 of the thread portion 41 engages with the screw groove 23 of the lead screw 11, when the one end of the extended portion 40 is fitted to the case 31. The thread portion 41 can come close to and come off from the lead screw 11.

Figure 4:
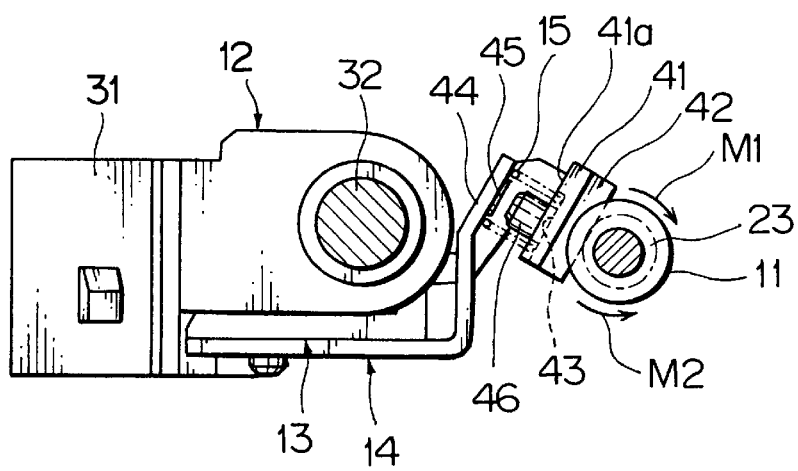
FIG. 4 is a sectional view taken along line IV—IV of FIG. 1.

The thread portion 41 has a surface 41a (called a rear face hereinafter) positioned in the side opposite to the lead screw 11. As illustrated in FIG. 4, the rear face 41a has a recess 43 and a projection 46. The recess 43 is a hole provided in the rear face 41a of the thread portion 41. The projection 46 protrudes from a bottom surface of the recess 43.

The restrictor piece 14 is formed by bending a metal plate bar or the like. The restrictor piece 14 is rigid to provide almost no deformation thereof.

As illustrated in FIG. 4, the restrictor piece 14 has one end fitted to the case 31 and has a restricting wall 44 facing the rear face 41a of the thread portion 41 of the engagement piece 13. That is, the restricting wall 44 is located to be opposed to the lead screw 11. The restricting wall 44 keeps a distance from the lead screw 11 of the engagement piece 13 such that the engagement piece 13 may not disengage from the lead screw 11. The restricting wall 44 have a flat surface parallel to the rear face of the thread portion 41. The restricting wall 44 has a projection 45 protruding toward the rear face of the thread portion 41.

Between the restrictor piece 14 and the rear face 41a of the thread portion 41, there is mounted the compressed coil spring 15 as described later. When the engagement piece 13 moves to disengage from the lead screw 11, the restricting wall 44 abuts against the thread portion 41 via the compressed coil spring 15. Thus, the restricting wall 44 limits the distance between the engagement piece 13 and the lead screw 11 such that the thread portion 41 may not disengage from the screw groove 23 of the lead screw 11.

As illustrated in FIG. 4, the compressed coil spring 15 is disposed between the rear face 41a of the thread portion 41 of the engagement piece 13 and the restricting wall 44 of the restrictor piece 14. One end of the compressed coil spring 15 is received in the recess 43 around the projection 46. The other end of the compressed coil spring 15 is supported on the restricting wall 44 and surrounds the projection 45. The compressed coil spring 15 urges the thread portion 41, that is, the engagement piece 13 against the lead screw 11.

The bearing portion 16 rotatively supports the lead screw 11. The bearing portion 16 has the first bearing 24 and the second bearing 25. The first bearing 24 rotatively supports the one end 11a of the lead screw 11, while and the second bearing 25 rotatively supports the other end 11b of the lead screw 11.

As illustrated in FIG. 2, the first bearing 24 has a wall 51 rising from the chassis 2, a recess 52 formed in the front surface of the wall 51, and a tapered surface 53 formed in an outer periphery of the recess 52. The recess 52 is circular in a plan view and receives the one end 11a of the lead screw 11.

The tapered surface 53 is a circumferential surface of the recess 52. As illustrated in FIG. 2, the tapered surface 53 is inclined relative to the shaft axis P of the lead screw 11 to gradually increase the inner diameter of the recess 52 toward the other end 11b of the lead screw 11.

As illustrated in FIG. 3, the second bearing 25 has a support extension 54 and a spring piece 55, which are rising from the chassis 2, to rotatively support the lead screw 11 of the other end 11b of the lead screw 11 therebetween.

The spring piece 55 is an extended plate perpendicular to the lead screw 11 and the guide shafts 32, 33. The spring piece 55 has one end fixed to chassis 2 and the other end facing an end face 11c of the other end 11b of the lead screw 11.

The other end of the spring piece 55 can resiliently deform to contact and to come off from the end face 11c of the lead screw 11. The spring piece 55 urges the end face 11c of the lead screw 11, that is, the other end 11b toward the one end 11a. Furthermore, the spring piece 55 allows the one end 11a of the lead screw 11 to move to come out of the recess 52.

Since the spring piece 55 of the second bearing 25 urges the end face 11c toward the one end 11a, the lead screw 11 enters the recess 52. While the lead screw 11 has been received in the recess 52, the lead screw 11 keeps the engagement with the thread 42 of the thread portion 41 of the engagement piece 13. Thus, the bearing portion 16 urges the lead screw 11 to engage with the engagement piece 13.

The one end 11a moves along the tapered surface 53 and the lead screw 11 moves apart from the engagement piece 13, when the second bearing 25 allows the one end 11a to come out of the recess 52 and the lead screw 11 is pushed by the engagement piece 13. Thus, the bearing portion 16 allows the lead screw 11 to move apart from the engagement piece 13.

In the thus configured pickup feed mechanism 1, the motor 10 rotates the lead screw 11 along an arrow M1 as illustrated in FIG. 4. The rotation of the lead screw 11 moves the engagement piece 13 along an arrow S1 of FIG. 1 in parallel with the lead screw 11 and the guide shafts 32, 33, since the engagement piece 13 has the thread portion 41 engaged with the screw groove 23.

The transfer of the engagement piece 13 along the lead screw 11 moves the restrictor piece 14 and the pickup assembly 12, that is, the pickup 30. Thus, the engagement piece 13 slides together with the restrictor piece 14 and the pickup assembly 12.

Meanwhile, the motor 10 rotates the lead screw 11 along an arrow M2 (FIG. 4) opposite to the arrow M1. The rotation of the lead screw 11 moves the engagement piece 13 along an arrow S2 of FIG. 1 in parallel with a longitudinal direction of the lead screw 11. In the thus configured pickup feed mechanism 1, the rotation of the motor 10 moves the pickup 30 to a desired position along the lead screw 11.

Figure 5:
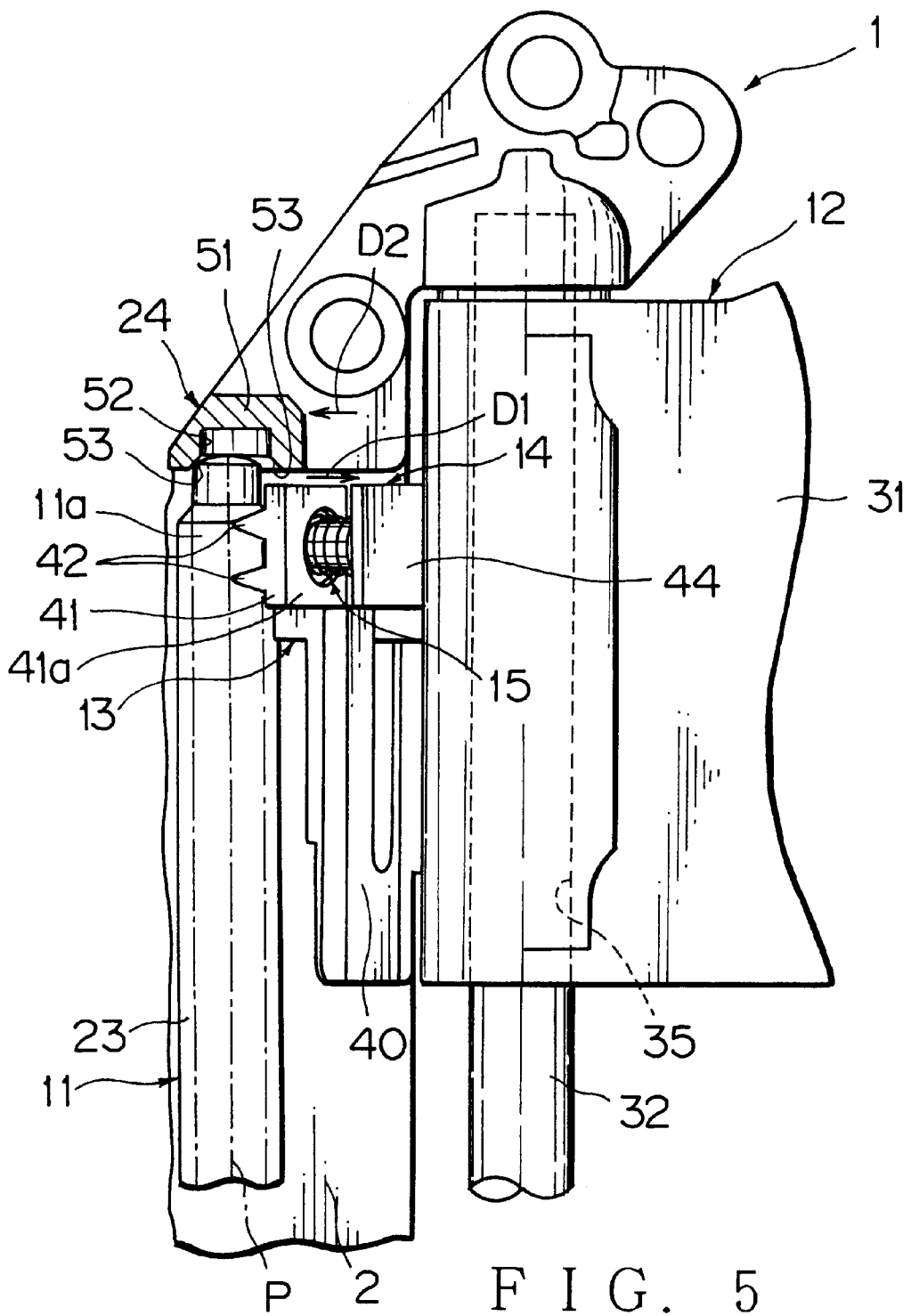
FIG. 5 is a plan view illustrating a state in which the one end of the lead screw and an engagement piece of the pickup feed mechanism of the embodiment moves apart from each other.

As illustrated in FIG. 5, when the engagement piece 13 is moved to the one end 11a of the lead screw 11, the lead screw 11 may be further rotated, causing the engagement piece 13 to disengage from the one end 11a. The engagement piece 13 is pressed along an arrow D1 of FIG. 5 by the screw groove 23 of the lead screw 11. Thus, the engagement piece 13 moves apart from the lead screw 11 along the arrow D1 against the resilient force of the compressed coil spring 15.

Furthermore, the restrictor piece 14 limits the distance of the engagement piece 13 from the screw shaft so that the engagement piece 13 does not completely disengage from the screw shaft. In this state, the lead screw 11 is pressed by the engagement piece 13 along an arrow D2 of FIG. 5, and the one end 11a of the lead screw 11 moves apart from the engagement piece 13.

Meanwhile, the spring piece 55 is urging the other end 11b toward the one end 11a and allows the one end 11a to come out of the recess 52. Thus, the one end 11a moves apart from the engagement piece 13 along the tapered surface 53 against a resilient force of the spring piece 55.

Accordingly, without a larger resilient force of the compressed coil spring 15 for urging the engagement piece 13 against the lead screw 11, the engagement piece 13 surely engages with the lead screw 11. This requires no increase in capacity of the motor 10.

Furthermore, when the lead screw 11 rotates to disengage the engagement piece 13 from the one end 11a, the lead screw 11 moves apart from the engagement piece 13. Thus, the compressed coil spring 15 need not have a smaller resilient force to surely disengage the lead screw 11 with the engagement piece 13.

That is, the compressed coil spring 15 may have a normal resilient force, allowing an easy design of the compressed coil spring 15. This is advantageous for the feed mechanism in a design thereof.

Moreover, the restrictor piece 14 limits the distance of the engagement piece 13 from the screw shaft so that the engagement piece 13 does not completely disengage from the screw shaft. This keeps the engagement of the lead screw 11 with the engagement piece 13 even with a weak resilient force of the compressed coil spring 15. Thereby, the pickup 30 may be surely moved to a desired position.

Furthermore, the first bearing 24 of the bearing portion 16 has the recess 52 provided with the outer peripheral tapered surface 53. The second bearing 25 urges the other end 11b of the lead screw 11 toward the one end 11a. Thus, when the rotation of the lead screw 11 causes the engagement piece 13 to disengage from the one end 11a, the one end 11a of the lead screw 11 moves apart from the engagement piece 13 along the tapered surface 53. This allows an unrestricted design of the compressed coil spring 15. This is advantageous for the feed mechanism in a design thereof.

Moreover, the support extension 54 rotatively supports the other end lib of the lead screw 11, and the spring piece 55 urges the end face 11c toward the one end 11a. This prevents the lead screw 11 from moving along its axial direction, except when the lead screw 11 is moved apart from the engagement piece 13. Thus, the pickup assembly 12 may be surely moved to a desired position.

Note that the engagement piece 13 of the present invention may be replaced by a known nut having a half cut body. The half nut has a screw groove engaged with the screw groove 23 of the lead screw 11.

What is claimed is:

1. A pickup feeding mechanism comprising:

a screw shaft having a screw groove and driven to turn, an engagement piece moving parallel to an axis of the screw shaft, the engagement piece having a thread portion engaged with the screw groove of the screw shaft, the engagement piece being movable toward and away from the screw shaft, a pickup assembly moving parallel to the axis of the screw shaft together with the engagement piece, and a bearing portion rotatively supporting the screw shaft, the bearing portion allowing the screw shaft to move in a direction coming away from the engagement piece when the engagement piece reaches an end of the screw shaft, a restrictor piece preventing the engagement piece from disengaging from the screw shaft and, a compressed coil spring disposed between the restrictor piece and the engagement piece for urging the engagement piece against the screw shaft, wherein the restrictor piece moves together with the pickup assembly, and the restrictor piece is located in an outer peripheral side of the screw shaft such that the engagement piece keeps a distance from the screw shaft not to disengage from the screw shaft, the engagement piece being able to abut against the restrictor piece.

2. The mechanism as claimed in claim 1 wherein the bearing portion has a first bearing rotatively supporting one end of the screw shaft and a second bearing rotatively supporting the other end of the screw shaft, the first bearing having a recess receiving the one end of the screw shaft and a tapered surface provided at an outer periphery of the recess, the tapered surface inclining outward to be opposed to the other end of the screw shaft, the second bearing resiliently urging the other end of the screw shaft toward the one end and allowing the one end of the screw shaft to disengage from the recess.

3. The mechanism as claimed in claim 2 wherein the second bearing has a support extension and a spring piece, the other end of the screw shaft rotatively supported between the support extension and the spring piece, the spring piece having an end face urging the other end of the screw shaft toward the one end of the screw shaft.

* * * * *